United States Patent
Zhang et al.

(10) Patent No.: US 9,835,773 B2
(45) Date of Patent: *Dec. 5, 2017

(54) DEPTH SENSING AUTO FOCUS MULTIPLE CAMERA SYSTEM

(71) Applicant: Intel Corporation, Santa Clara, CA (US)

(72) Inventors: Daniel H. Zhang, Portland, OR (US); Richmond Hicks, Beaverton, OR (US)

(73) Assignee: INTEL CORPORATION, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/219,516

(22) Filed: Jul. 26, 2016

(65) Prior Publication Data

US 2017/0054967 A1   Feb. 23, 2017

Related U.S. Application Data

(63) Continuation of application No. 14/828,964, filed on Aug. 18, 2015, now Pat. No. 9,426,450.

(51) Int. Cl.
*G02B 3/12* (2006.01)
*G02B 7/28* (2006.01)
(Continued)

(52) U.S. Cl.
CPC ............... *G02B 3/12* (2013.01); *G02B 7/285* (2013.01); *G02B 13/22* (2013.01); *G03B 13/20* (2013.01);
(Continued)

(58) Field of Classification Search
None
See application file for complete search history.

(56) References Cited

U.S. PATENT DOCUMENTS 8,406,619 B2   3/2013 Cameron et al.
9,426,450 B1 *  8/2016 Zhang ............... H04N 13/0271
(Continued)

FOREIGN PATENT DOCUMENTS

JP        2012-521580      9/2012
KR   10-2012-0094185      8/2012

OTHER PUBLICATIONS

PCT International Search Report and Written Opinion of the International Searching Authority for International Application No. PCT/US2016/040574, dated Oct. 11, 2016, 12 pages.

*Primary Examiner* — W B Perkey
(74) *Attorney, Agent, or Firm* — Blakely, Sokoloff, Taylor & Zafman LLP.

(57) ABSTRACT

A depth sensing multiple camera system is described that uses depth sensing cameras. In one example, the camera system includes a primary auto-focus camera to capture an image of a scene at a first focus distance, the primary camera having a fixed field of view through different focus distances, a secondary auto-focus camera to capture an image of the same scene at a second focus distance, the secondary camera having a fixed field of view through different focus distances, and a processor having a port coupled to the primary camera to receive images from the primary camera and also coupled to the secondary camera to receive images from the secondary camera and to determine a depth map for the captured primary camera image using the captured secondary camera image.

20 Claims, 6 Drawing Sheets

(51) Int. Cl.
    *H04N 5/232*     (2006.01)
    *G03B 13/20*     (2006.01)
    *G03B 13/32*     (2006.01)
    *G03B 35/00*     (2006.01)
    *G02B 13/22*     (2006.01)

(52) U.S. Cl.
    CPC ............. *G03B 13/32* (2013.01); *G03B 35/00* (2013.01); *H04N 5/23212* (2013.01); *H04N 5/23293* (2013.01)

(56) References Cited

U.S. PATENT DOCUMENTS

| | | |
|---|---|---|
| 9,451,238 B2 | 9/2016 | Lee |
| 2012/0162379 A1 | 6/2012 | Dahi et al. |
| 2013/0057655 A1* | 3/2013 | Su ............................ G02B 7/30 |
| | | 348/47 |
| 2013/0121559 A1* | 5/2013 | Hu ........................ G06T 7/0075 |
| | | 382/154 |
| 2013/0135441 A1* | 5/2013 | Deng .................... G06T 7/0075 |
| | | 348/47 |
| 2014/0044314 A1 | 2/2014 | Sezer |
| 2014/0098195 A1 | 4/2014 | Pace et al. |
| 2014/0232831 A1* | 8/2014 | Shi .................... H04N 13/0242 |
| | | 348/48 |
| 2015/0334309 A1* | 11/2015 | Peng .................. H04N 5/23229 |
| | | 348/47 |

\* cited by examiner

DEPTH SENSING AUTO FOCUS MULTIPLE CAMERA SYSTEM

CROSS-REFERENCE TO RELATED APPLICATIONS

The present application is a continuation of prior filed application Ser. No. 14/828,964, filed Aug. 18, 2015, entitled DEPTH SENSING AUTO FOCUS MULTIPLE CAMERA SYSTEM, assigned to the current assignee, the priority of which is hereby claimed.

FIELD

The present description relates to the field of depth sensing using cameras in a portable device and in particular to depth sensing with auto focus cameras.

BACKGROUND

Portable devices, such as computers, tablets, and cellular telephones are commonly equipped with a camera on the front directed to the user and a camera on the back directed away from the user. The front camera is typically used for video conferencing and self-portraits, while the rear camera is typically used for video and still photography.

Small digital camera modules have become commonplace on portable telephone, communication, entertainment, and media devices. There is a corresponding increase in the use of cameras for security, navigation, safety, and other uses. Two cameras directed at the same scene from different positions provide stereo vision allowing for depth perception. An array of cameras or image sensors mounted to a single device can also enable many other compelling 3D user experiences, including temporal resolution and increased dynamic range. A variety of different portable photographic, computing, and media player devices can be adapted to integrate camera array technology on their platforms.

Some devices offer two or more cameras on the back side to allow stereo or three-dimensional images or video to be taken and recorded. A device with two or more cameras for depth perception allows for a variety of different additional functions. As an example, a depth map can be overlaid on a still image as a tool for enhancing the image. The depth map can be used for motion effects (parallax views), for depth measurement and for applying digital filters that select based on depth, such as refocus, layered filters, and view synthesis, among others. In addition, a variety of other types of computational photography may be enabled.

BRIEF DESCRIPTION OF THE DRAWINGS

Embodiments are illustrated by way of example, and not by way of limitation, in the figures of the accompanying drawings in which like reference numerals refer to similar elements.

DETAILED DESCRIPTION

A multiple image sensor device provides two and three dimensional operation using software and hardware features that enable depth photography. Multiple image sensors are mounted on the same side of the device to each have a different view of the same scene. The images are synchronized and tracked. The portable imaging system quickly changes modes and in some embodiments provides a new depth capture workflow. This may include generating depth maps by determining image disparity information, as well as calibrating and correcting captured frames.

Disparity calculations typically rely on comparing the image of a single scene as viewed from two cameras. If there are more than two cameras, then a primary camera is designated. The view from each other camera is compared to the primary camera pair-wise. The differences or disparities in the images from the different cameras may be used to determine the distance from the cameras to objects in the scene. This determination relies on the distance between the cameras, the focal lengths of the cameras, and the dimensions of the sensors. The cameras used in a smart phone are typically very small fixed focal length cameras with auto-focus optical systems to allow image capture for very near objects as well as distant ones.

In many lens systems including those used for compact camera modules and most still cameras, the focal length changes with focus distance. The focal length determines the camera's field of view or amount of zoom. In other words, when focused on a distant object in a scene, the image sensor will see more of the scene than when the camera is focused on a near object in the exact same scene in the same position. While the optical system may be designed to maintain a constant focal length at different focus distances. This greatly increases the cost of the optical system.

Figure 1:
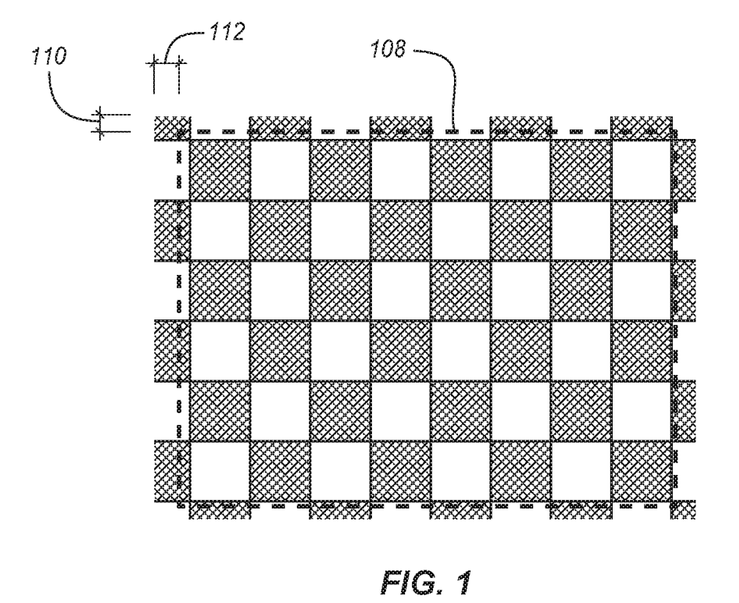
FIG. 1 is a drawing of a scene captured by a camera sensor using a long focus distance and a lens with focus breathing.
Figure 2:
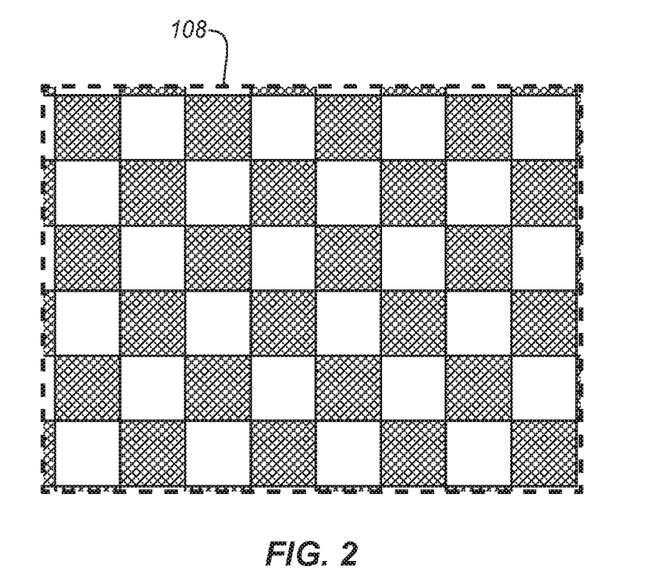
FIG. 2 is a drawing of the same scene captured by the camera sensor using a short focus distance.

FIG. 1 shows a scene in the form of a chess board. A camera is focused on the chess board which is at a distance, for example, of over 50 cm. In FIG. 2, the same camera in the same position is directed at the same chess board, however, in this case the camera is focused at a distance of, for example, less than about 10 cm. As a result the view of the chess board which is over 50 cm away is blurred.

Comparing FIGS. 1 and 2, in FIG. 2, the field of view is indicated by a frame line 108. This field of view is overlaid onto the image of FIG. 1. As shown, at the longer focus distance, the field of view is increased by about 8%. There is an additional height 110 and width 112 of the image as compared to the FIG. 2 view. This difference in field of view with focus distance is sometimes referred to as focus breathing. At the same time changing the focus distance may also cause other distortions and aberrations to change. All of these changes to the image must be compensated for in order to obtain a reliable depth map from the two images and even then the accuracy will be reduced.

In a small portable device, the cameras are very small. This allows more space for other components in the device and provides a light and thin form factor. The small camera uses a small image sensor which uses small pixels. The small pixels capture only a small amount of the available light so that the lens system of the camera uses a large aperture to allow more light to pass to the image sensor. At the same time the camera is very thin to allow for a thin overall form factor for the device. The resulting very short, large aperture lens system has a narrow depth of field. The narrow depth of field requires that the lens be focused in order to be able to capture focused images of both far away mountains and portraits of friends. An even greater focusing range is required to capture focused images of coins, postage stamps, or QR (Quick Response) codes.

These very short large aperture lens systems are sensitive to small changes in the position and the precise dimensions of each optical element. Temperature changes can change the focus distance, field of view, and aperture size. Humidity and altitude changes can affect the operation of the mechanisms. Movement of the lens system through vibration, or even changes in the direction of gravity can change the relative positions of the optical elements which then changes the focus distance, field of view, and aperture size. The lens systems are subject to these and other external factors and also may have variations in manufacturing in different lots and between different items in a single manufacturing lot.

In order to overcome the many variations in the results that a portable device camera produces, the cameras are equipped with auto focus to adjust the focus distance regardless of the condition of the lens system and auto exposure to adjust the exposure time regardless of the size of the aperture. While such a camera produces results that are consistently high quality, the images are not necessarily consistent from one image to the next.

Figure 3:
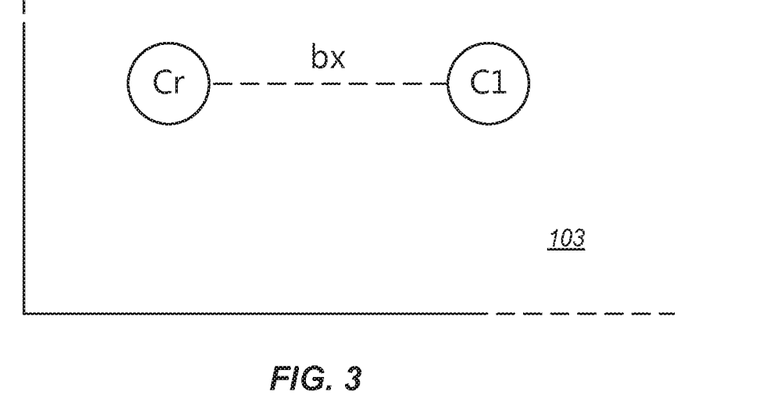
FIG. 3 is a plan view diagram of a back surface of a camera device with stereo vision.

When making disparity determinations, the images of a scene from two or more cameras are compared. Typically the cameras are identical and each pixel of each camera is compared to each pixel of the other camera. When an object is shifted a few pixels away between the two scenes, this pixel shift is used to determine the depth. Such a configuration is shown in FIG. 3, a diagram of two cameras on a device. In this case a reference camera Cr and a depth camera C1 are both attached to the same surface of a device 103. The differences between the images from the two cameras for any one object in the scene are used to determine distance from the cameras to the scene. In this case, the two cameras are mounted on the same surface and are vertically aligned so that the only relevant dimension for the depth determination is the horizontal distance between the two cameras bx.

While it is not necessary to use identical cameras, it is necessary to know the differences between images produced by the two cameras. The image must be captured at about the same time to avoid errors caused by movement of the object in the scene or movement of the cameras. Any unknown differences will cause errors in the distance determination. If the field of view of the cameras is unknown by a factor of 8% as discussed above, then it may be difficult to make a useful depth determination. As a result fixed focus cameras are used for the FIG. 3 system.

Depth determinations are currently made using two types of systems. In a dual aperture system a single camera with a single lens system is used that has two apertures. The scene is imaged twice on the same sensor, once for each aperture. The dual aperture system ensures that both images of the scene are captured through the same lens system. However the two scenes are very close together so that the accuracy is reduced. In another type of system, two fixed focus lenses are used. The fixed focus lens has a single focal length, a single focus distance, and a single aperture. As a result, there are no moving optical elements and the field of view is essentially fixed. It changes only very little, if at all, with normal thermal expansion and compression.

The depth determinations rely on identifying objects in the scene and then comparing the position of that object on the two images from the two cameras. The identified object must be focused well enough to be able to clearly identify edges and texture. With a fixed focus camera, the range of focused distances can be increased by using a smaller image sensor or by reducing the size of the aperture. The smaller image sensor reduces the quality of the picture and both of these measures reduce the ability of the camera to capture details in low light. This can make the two camera system unacceptable for many photographic and video uses.

Figure 4:
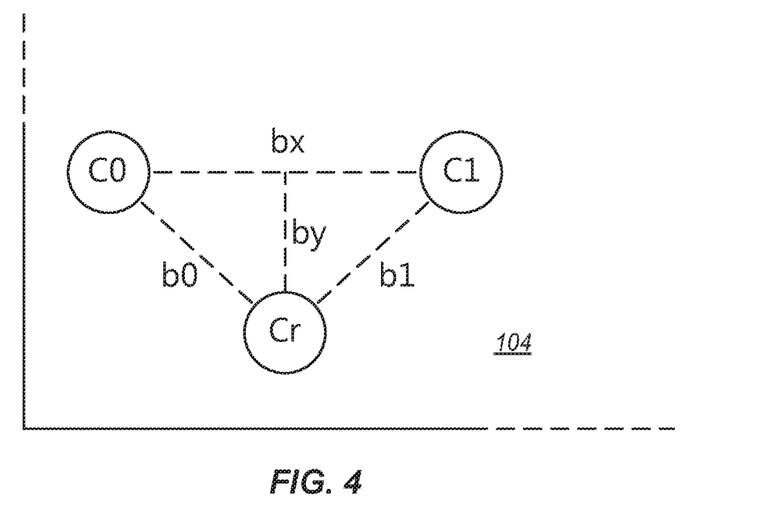
FIG. 4 is a plan view diagram of a back surface of a camera device with a reference camera and two depth cameras.

In order to overcome the limitations of fixed focus lens cameras, in another variation, two or more low resolution and small fixed focus lenses are used together with a higher resolution auto focus camera. The auto focus camera provides rich color and detail while the fixed focus cameras determine a depth map to apply to the auto focus camera image. Such a system is currently available from Intel Corp. as the Intel® RealSense™ Snapshot Depth Camera. This is shown in the diagram of FIG. 4.

Three cameras Cr, C0, C1 are used in a triangle configuration on a surface of a portable device 104. A reference camera Cr is a higher pixel count auto focus camera and is used as the reference point for the position of the other two cameras C0, C1. The second camera C0 is a specific distance b0 from the reference camera Cr. This distance has a vertical component by and a horizontal component bx. Similarly, the third camera C1 is a distance b1 from the reference camera and has the same horizontal component bx in the opposite direction and vertical component by. While the image results are much better than in the FIG. 3 implementation, the depth determinations with such a three camera system are more complex. There is also an added operation of relating the determined depth to the reference camera.

Another way to overcome the limitations of fixed focus and auto focus camera modules is to use a different lens system for the camera module. A different lens system may be designed to minimize focus breathing and also to minimize distortions and aberrations that can affect a depth measurement. There are a variety of such lens designs including lens systems optimized for video and telecentric lenses optimized for machine vision. Another such lens system design uses a deformable optical element to change the focus distance without moving any of the optical elements. The lack of moving parts allows the lens system to obtain higher precision at lower cost.

In one example of a deformable optical element, a MEMs (Micro-Electro-Mechanical) system applies an electrical field to a viscous element to change the shape of the element and thereby the optical power of the element. The element is typically the objective placed at the end of the lens system opposite the sensor. However, the deformable element may be placed in another location. Such a device may be designed or controlled to maintain a constant or fixed field of view as the focus distance changes at less cost than a rigid lens system.

Figure 5:
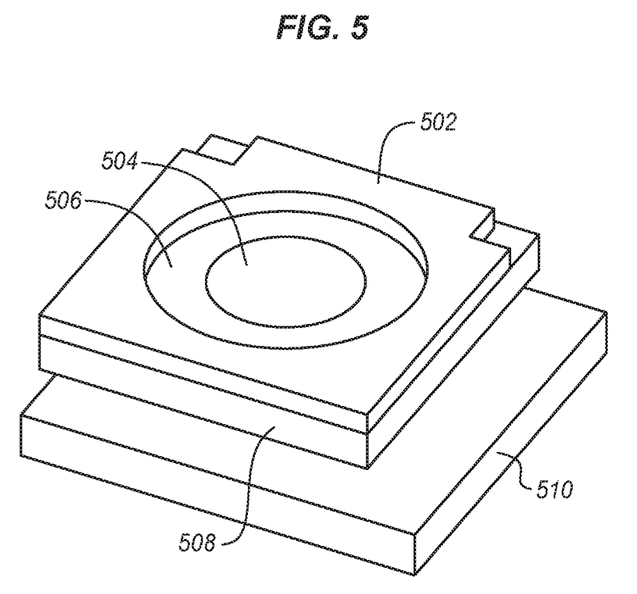
FIG. 5 is an isometric diagram of a camera module using a deformable membrane as an optical element.

FIG. 5 shows a MEMS AF structure. A bare die 502 has 2 bonding pads dedicated to electrical connections the die. An optical membrane 504 is released onto an optical oil filled cavity. A MEMs actuator 506 is embedded into the die at the periphery of the optical membrane. When the MEMs actuators are supplied with power, the optical oil flows through the membrane and is distributed either closer to or farther away from the center of the membrane, depending on the supplied power. The flexible membrane changes shape as the oil is driven towards or away from the center. The shape becomes thicker or thinner in the middle compared to the edges which changes the optical power of the optical membrane. The change in optical power may be used to focus the membrane or a multiple element system at different focus distances.

The MEMS structure may also include a transparent substrate to carry the membrane, oil, and actuators 508. This is all position over an image sensor 510 such as a CMOS (Complementary Metal Oxide Semiconductor) photodiode array. There may also be additional optical elements (not shown) above or below the MEMS structure. In this system instead of driving a voice coil motor to physically move an element, a voltage is used to move the oil in the membrane. Moving the optical oil may require less power than operating the voice coil.

Figure 6:
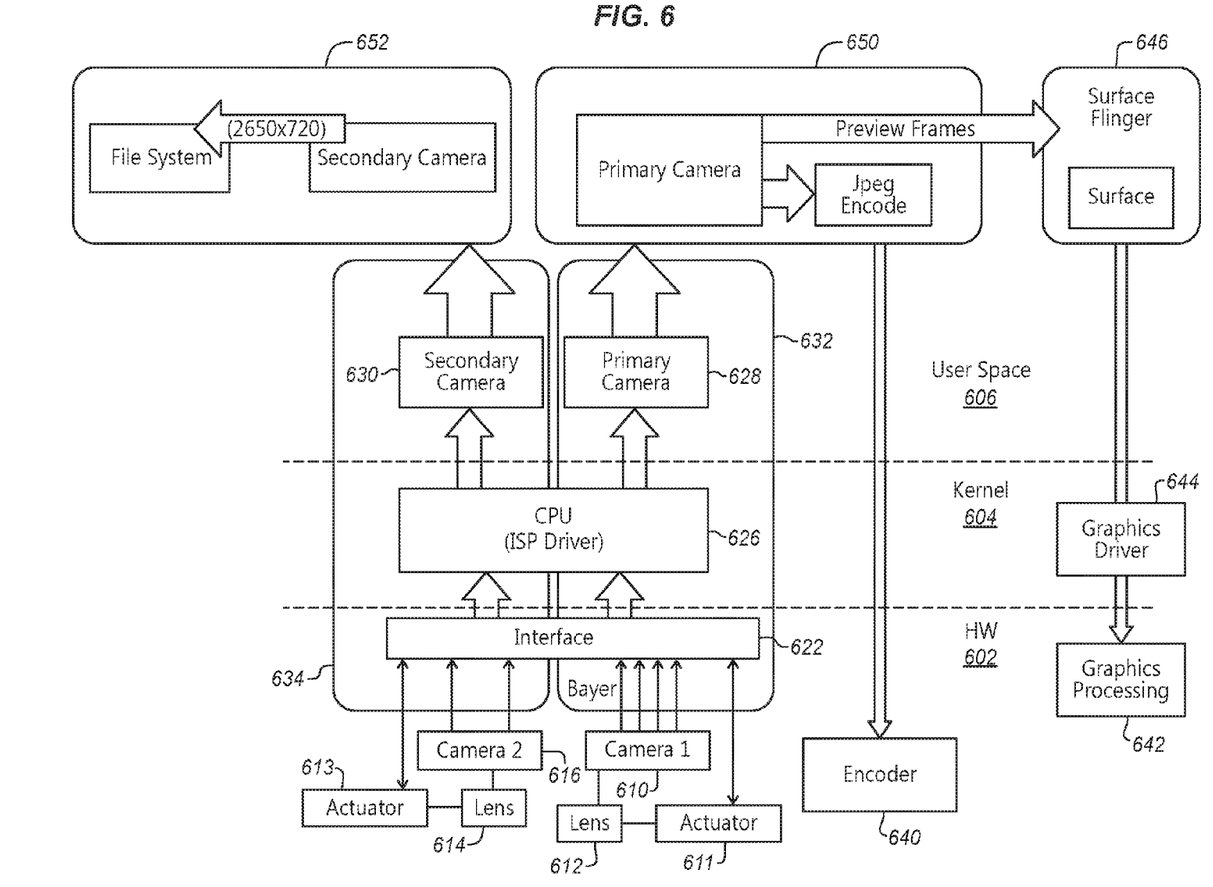
FIG. 6 is a hybrid hardware and software diagram of a software stack for image processing and depth processing using two cameras.

FIG. 6 is a diagram of an example software stack for a two camera system such as that of FIG. 4. The software stack is built on a hardware layer foundation 602. A kernel layer 604 is built over the hardware layer and a user space 606 is built over the kernel layer. The hardware layer includes a primary camera 610 coupled to an interface 622 to an image signal processor (ISP) or central processing unit (CPU) 626. The CPU operates the graphics driver 644 for the ISP. The secondary camera 616 is also coupled to the interface 622 to the main image signal processor 626. The main ISP is coupled to the same ISP graphics driver through a different port. A front camera (not shown) may also be coupled to the CPU 626 to allow the system to switch from the front camera to the rear cameras.

The primary camera 610 includes an autofocus lens system 612 that is controlled by an actuator 611. The actuator is coupled through the interface to the ISP at the kernel level. Similarly, the secondary camera 616 has a lens system 614 controlled by an actuator 613 that is coupled through the interface to the ISP. In some implementations the processor is coupled to the actuator of the primary and secondary auto focus camera to control the voltage applied to the cavity of each camera. The voltage then controls the shape of the deformable optical element. In other embodiments, the actuator is coupled to the voice coil motor of a telecentric or other lens that has little or no focus breathing.

The hardware configuration of FIG. 6 is also reflected in this software stack representation. Further variations and modifications may be made to suit different implementations. At the kernel level, the CPU 626 through the graphics driver 644 receives the image sensor data from the cameras and sends it to the user space. In the user space or application layer, there are first 650 and second 652 camera systems, respectively. The primary camera system supports encoding and preview features. The preview features are supplied to a display 646. The encoding is sent to a hardware encoder 640 at the hardware layer.

The secondary camera system supports file storage for use by image processing to develop depth data and to support other applications. Finally the support for the display is shown including a hardware level graphics processor 642 and a kernel level graphics driver 644 to provide graphics for the display. There may also be a user input system, such as, buttons, keys, a touchscreen interface in the display 646 or any of a variety of other input systems which provide commands from the user space to the kernel layer.

Frame synchronization may be used between the cameras to provide better depth information. The frames may be synchronized based on frame counters. A hardware connection may be used to provide a frame synchronizing capability that will initiate the start of frames for each camera where the primary camera drives the secondary camera.

Figure 7:
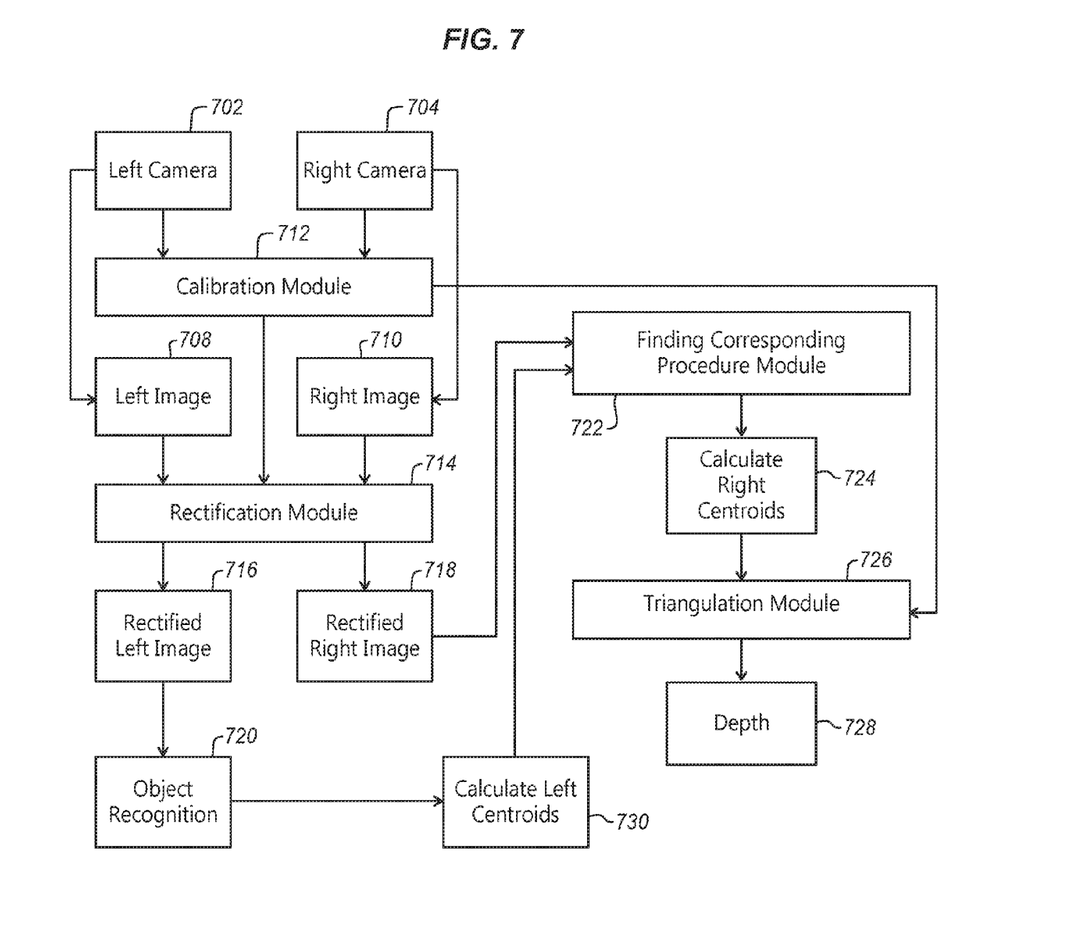
FIG. 7 is a hybrid system and method diagram of hardware and operations for depth processing using two cameras.

FIG. 7 is a diagram of a system and method for determining depth using two fixed focus cameras as shown in FIG. 3. This approach may be used for the two depth cameras of FIG. 4 C0, C1 without considering the reference camera. Using cameras with very low or no focus breathing, this method may be applied to high accuracy cameras. The method does not accommodate changes in focal length with focus distance and so is particularly useful with telecentric lens systems or lens systems with deformable elements.

The system has a left camera 702 and a right camera 704. While the cameras will be referred to as left and right they may be upper and lower or separated in any other direction. While only one pair of cameras is discussed, there may be additional cameras. One camera may be the primary so that each of the other cameras is compared to the primary camera for a depth determination or the results from the cameras may be compared in any other desired way.

The left and the right camera produce a left image 408 and a right image 410, respectively. These are buffered for further processing. The images are then each applied to a rectification module 417. The respective rectified left 416 and right 418 images are then buffered. The rectification corrects the images based on a calibration. A calibration module 412 is coupled to the two cameras and compares the field of view at the current focus distance. Based on this comparison calibration parameters are developed for one or both cameras. These parameters are applied by the rectification module. The calibration module determines any distortions or aberrations in the images and the rectification module scales one or both images so that the field of view matches. The images are then merged to the same plane to produce the rectified images.

After the image is rectified any of a number of different processes may be applied, depending on the usage model or intended user experience. In this example, a depth map is produced, but any other process may be applied in addition or instead. The left camera is selected as the primary camera. However either camera may be selected. The rectified left image is provided from a buffer to an object recognition module. The module identifies objects using any desired approach. This may be done using edge detection, centroid detection, or any other desired object recognition technique.

In this example, the object recognition 420 identifies objects and then a left centroids module 430 determines the centroids for the identified objects. The determined centroids are then applied to the rectified right image 418 in a correspondence module 422. The corresponding objects in the right image are matched up to those in the left image. With these objects identified in the right image, then the centroids in the right image for these objects are found in the right image in a right centroids module 427.

With the centroids of the recognized objects established for both images, triangulation may be applied in a triangulation module to determine the distance to the object. The distances are all compiled in a depth module 428 to generate a depth map. The depth map may be applied to other processes to determine other distances and dimensions, to apply effects, to combine objects or images with the left or right or both images or to perform any other desired additional operations.

The triangulation may be performed in any of a variety of different ways. In some embodiments a sum of absolute differences is used to identify objects for a disparity-based depth estimation. For a recognized object in the scene, its image on the left sensor and on the right sensor is identified. The intensity of likely pixels and surrounding pixels are compared using the two images in order to find the edges or centroids of the object on the two captured images. Using the disparity in the position of the object between the two images, the geometry of the camera positions and the lens systems, the distance from the image plane of the sensors to the location of the identified object may be determined.

Figure 8:
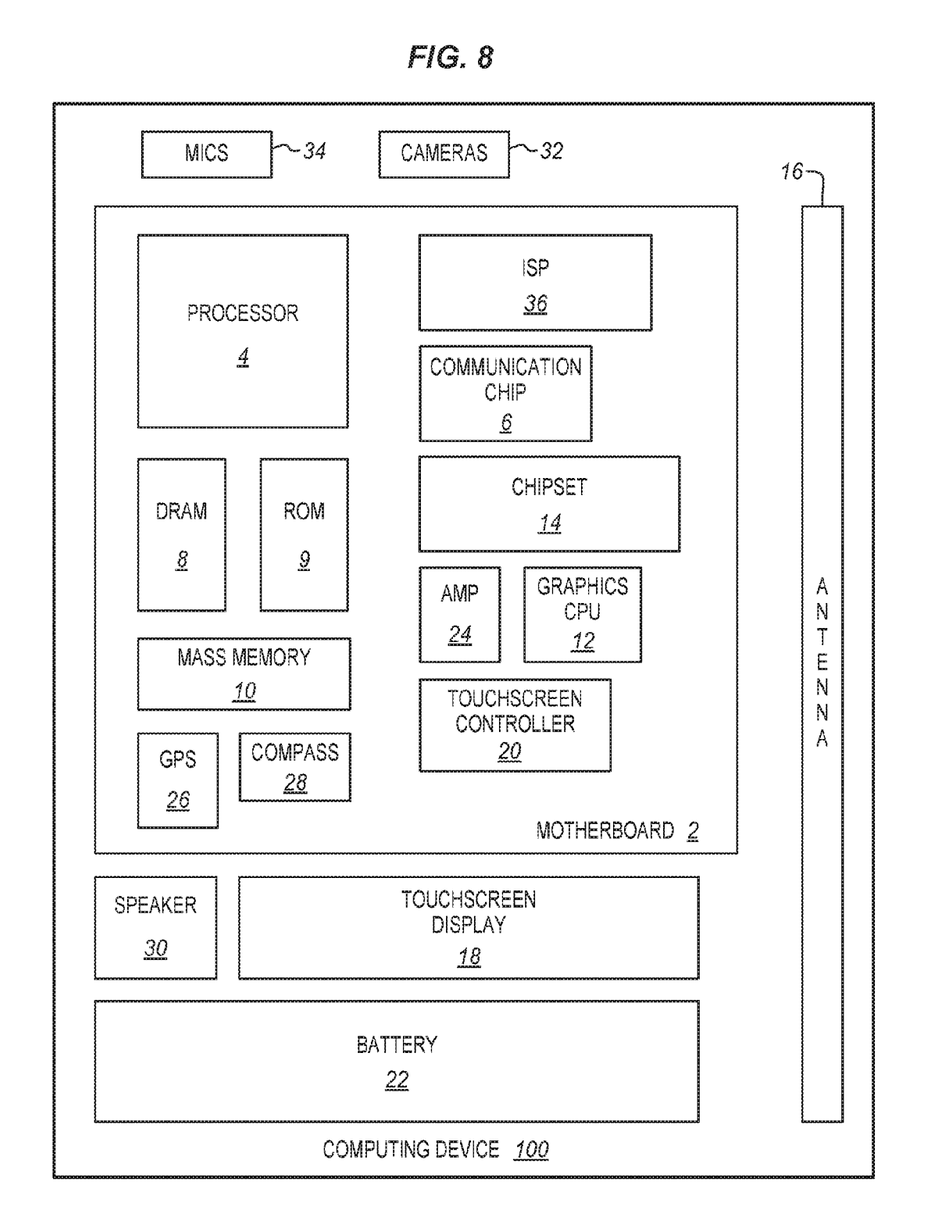
FIG. 8 is a block diagram of a computing and camera device incorporating an image processing system with multiple cameras according to an embodiment.

FIG. 8 illustrates a computing device 100 in accordance with one implementation. The computing device 100 houses a system board 2. The board 2 may include a number of components, including but not limited to a processor 4 and at least one communication package 6. The communication package is coupled to one or more antennas 16. The processor 4 is physically and electrically coupled to the board 2.

Depending on its applications, computing device 100 may include other components that may or may not be physically and electrically coupled to the board 2. These other components include, but are not limited to, volatile memory (e.g., DRAM) 8, non-volatile memory (e.g., ROM) 9, flash memory (not shown), a graphics processor 12, a digital signal processor (not shown), a crypto processor (not shown), a chipset 14, an antenna 16, a display 18 such as a touchscreen display, a touchscreen controller 20, a battery 22, an audio codec (not shown), a video codec (not shown), a power amplifier 24, a global positioning system (GPS) device 26, a compass 28, an accelerometer (not shown), a gyroscope (not shown), a speaker 30, a camera 32, a microphone array 34, and a mass storage device (such as hard disk drive) 10, compact disk (CD) (not shown), digital versatile disk (DVD) (not shown), and so forth). These components may be connected to the system board 2, mounted to the system board, or combined with any of the other components.

The communication package 6 enables wireless and/or wired communications for the transfer of data to and from the computing device 100. The term "wireless" and its derivatives may be used to describe circuits, devices, systems, methods, techniques, communications channels, etc., that may communicate data through the use of modulated electromagnetic radiation through a non-solid medium. The term does not imply that the associated devices do not contain any wires, although in some embodiments they might not. The communication package 6 may implement any of a number of wireless or wired standards or protocols, including but not limited to Wi-Fi (IEEE 802.11 family), WiMAX (IEEE 802.16 family), IEEE 802.20, long term evolution (LTE), Ev-DO, HSPA+, HSDPA+, HSUPA+, EDGE, GSM, GPRS, CDMA, TDMA, DECT, Bluetooth, Ethernet derivatives thereof, as well as any other wireless and wired protocols that are designated as 3G, 4G, 5G, and beyond. The computing device 100 may include a plurality of communication packages 6. For instance, a first communication package 6 may be dedicated to shorter range wireless communications such as Wi-Fi and Bluetooth and a second communication package 6 may be dedicated to longer range wireless communications such as GPS, EDGE, GPRS, CDMA, WiMAX, LTE, Ev-DO, and others.

The cameras 32 contain image sensors with auto focus lens systems as described herein. The image sensors may use the resources of an image processing chip 36 to read values and also to perform format conversion, coding and decoding, noise reduction and 3D mapping, etc. The processor 4 is coupled to the image processing chip 36 to drive the processes, set parameters, etc.

In various implementations, the computing device 100 may be a laptop, a netbook, a notebook, an ultrabook, a smartphone, a wearable device, a tablet, a personal digital assistant (PDA), an ultra mobile PC, a mobile phone, a desktop computer, a server, a printer, a scanner, a monitor, a set-top box, an entertainment control unit, a digital camera, a portable music player, or a digital video recorder. The computing device may be fixed, portable, or wearable. In further implementations, the computing device 100 may be any other electronic device that processes data.

Embodiments may be implemented using the cameras 32 together with the processors 4, 36 and any other desired components which may or may not be shown including one or more memory chips, controllers, CPUs (Central Processing Unit), microchips or integrated circuits interconnected using a motherboard, an application specific integrated circuit (ASIC), and/or a field programmable gate array (FPGA).

References to "one embodiment", "an embodiment", "example embodiment", "various embodiments", etc., indicate that the embodiment(s) so described may include particular features, structures, or characteristics, but not every embodiment necessarily includes the particular features, structures, or characteristics. Further, some embodiments may have some, all, or none of the features described for other embodiments.

In the following description and claims, the term "coupled" along with its derivatives, may be used. "Coupled" is used to indicate that two or more elements co-operate or interact with each other, but they may or may not have intervening physical or electrical components between them.

As used in the claims, unless otherwise specified, the use of the ordinal adjectives "first", "second", "third", etc., to describe a common element, merely indicate that different instances of like elements are being referred to, and are not intended to imply that the elements so described must be in a given sequence, either temporally, spatially, in ranking, or in any other manner.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein. Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

The following examples pertain to further embodiments. The various features of the different embodiments may be variously combined with some features included and others excluded to suit a variety of different applications. Some embodiments pertain to an imaging device that includes a primary auto-focus camera to capture an image of a scene at a first focus distance, the primary camera having a fixed field of view through different focus distances, a secondary auto-focus camera to capture an image of the same scene at a second focus distance, the secondary camera having a fixed field of view through different focus distances, and a processor having a port coupled to the primary camera to receive images from the primary camera and also coupled to the secondary camera to receive images from the secondary camera and to determine a depth map for the captured primary camera image using the captured secondary camera image.

In further embodiments the primary and secondary auto-focus cameras each include a lens system having a deformable optical element.

In further embodiments the primary and secondary auto-focus lens systems have no moving parts.

In further embodiments the deformable element comprises an optical membrane in an oil filled cavity and wherein the membrane changes shape with movement of the optical oil induced by a voltage applied to the cavity.

In further embodiments the processor is coupled to the primary and secondary auto focus camera to control the voltage applied to the cavity of each camera.

In further embodiments the primary and secondary auto-focus cameras each include a telecentric lens system.

In further embodiments the primary camera has a first field of view and the secondary camera has a second field of view and the first and the second field of view are the same.

In further embodiments the first and the second focus distance are the same.

In further embodiments the processor is to determine a depth map by recognizing objects in a primary camera image, finding corresponding objects in a corresponding secondary camera image, determining positions of the found objects in the respective images and performing triangulation using the determined positions to determine a distance to each object.

Further embodiments include a third auto-focus camera having a higher resolution to capture an image of the same scene and determining a depth map comprises relating the depth map to an image of the third camera.

Some embodiments pertain to an apparatus that includes a first means for capturing an image of a scene at a first focus distance, the first image capturing means having a fixed field of view through different focus distances, a second means for capturing an image of the same scene at a second focus distance, the second image capturing means having a fixed field of view through different focus distances, and means for processing having a port coupled to the primary camera to receive images from the first image capturing means and also coupled to the second image capturing means to receive images from the second image capturing means to determine a depth map for an image from the first image capturing means using an image from the second image capturing means.

In further embodiments the first and second image capturing means each have an autofocus lens system having a deformable optical element.

In further embodiments the auto-focus lens systems have no moving parts.

In further embodiments the deformable element comprises an optical membrane in an oil filled cavity and the membrane changes shape with movement of the optical oil induced by a voltage applied to the cavity.

In further embodiments the first and second the first and second image capturing means each include a telecentric lens system.

In further embodiments the first image capturing means has a first field of view and the second image capturing means has a second field of view and wherein the first and the second field of view are the same.

Some embodiments pertain to a portable device that includes a display on a first surface of the device, a user interface, a primary auto-focus camera on a second surface of the device opposite the first surface to capture an image of a scene at a first focus distance, the primary camera having a fixed field of view through different focus distances, a secondary auto-focus camera on the second surface of the device to capture an image of the same scene at a second focus distance, the secondary camera having a fixed field of view through different focus distances, and a processor having a port coupled to the primary camera to receive images from the primary camera and also coupled to the secondary camera to receive images from the secondary camera and to determine a depth map for the captured primary camera image using the captured secondary camera image.

In further embodiments the primary and secondary auto-focus cameras each include a lens system having a deformable optical element.

In further embodiments the primary camera has a first field of view and the secondary camera has a second field of view and wherein the first and the second field of view are the same.

Further embodiments include a third auto-focus camera on the second surface having a higher resolution to capture an image of the same scene and determining a depth map comprises relating the depth map to an image of the third camera.

What is claimed is:

1. An imaging device comprising:
   a primary auto-focus camera to capture an image of a scene at a first focus distance, the primary camera having a fixed field of view through different focus distances;
   a secondary auto-focus camera to capture an image of the same scene at a second focus distance, the secondary camera having a fixed field of view through different focus distances; and
   a processor having a port coupled to the primary camera to receive images from the primary camera and also coupled to the secondary camera to receive images from the secondary camera and to determine a depth map for the captured primary camera image using the captured secondary camera image.

2. The imaging device of claim 1, wherein the primary and secondary auto-focus cameras each include a lens system having a deformable optical element.

3. The imaging device of claim 2, wherein the primary and secondary auto-focus lens systems have no moving parts.

4. The imaging device of claim 3, wherein the deformable element comprises an optical membrane in an oil filled cavity and wherein the membrane changes shape with movement of the oil induced by a voltage applied to the cavity.

5. The imaging device of claim 3, wherein the processor is coupled to the primary and secondary auto focus camera to control the voltage applied to the cavity of each camera.

6. The imaging device of claim 1, wherein the primary and secondary auto-focus cameras each include a telecentric lens system.

7. The imaging device of claim 1, wherein the primary camera has a first field of view and the secondary camera has a second field of view and wherein the first and the second field of view are the same.

8. The imaging device of claim 1, wherein the first and the second focus distance are the same.

9. The imaging device of claim 1, wherein the processor is to determine a depth map by recognizing objects in a primary camera image, finding corresponding objects in a corresponding secondary camera image, determining positions of the found objects in the respective images and performing triangulation using the determined positions to determine a distance to each object.

10. The imaging device of claim 1, further comprising a third auto-focus camera having a higher resolution to capture an image of the same scene and determining a depth map comprises relating the depth map to an image of the third camera.

11. An apparatus comprising:
a first means for capturing an image of a scene at a first focus distance, the first image capturing means having a fixed field of view through different focus distances;
a second means for capturing an image of the same scene at a second focus distance, the second image capturing means having a fixed field of view through different focus distances; and
means for processing having a port coupled to the first image capturing means to receive images from the first image capturing means and also coupled to second image capturing means to receive images from the second image capturing means to determine a depth map for an image from the first image capturing means using an image from the second image capturing means.

12. The apparatus of claim 1, wherein the first and second image capturing means each have an autofocus lens system having a deformable optical element.

13. The apparatus of claim 12, wherein the auto-focus lens systems have no moving parts.

14. The apparatus of claim 13, wherein the deformable element comprises an optical membrane in an oil filled cavity and wherein the membrane changes shape with movement of the oil induced by a voltage applied to the cavity.

15. The apparatus of claim 12, wherein the first and second image capturing means each include a telecentric lens system.

16. The apparatus of claim 11, wherein the first image capturing means has a first field of view and the second image capturing means has a second field of view and wherein the first and the second field of view are the same.

17. A portable device comprising:
a display on a first surface of the device;
a user interface;
a primary auto-focus camera on a second surface of the device opposite the first surface to capture an image of a scene at a first focus distance, the primary camera having a fixed field of view through different focus distances;
a secondary auto-focus camera on the second surface of the device to capture an image of the same scene at a second focus distance, the secondary camera having a fixed field of view through different focus distances; and
a processor having a port coupled to the primary camera to receive images from the primary camera and also coupled to the secondary camera to receive images from the secondary camera and to determine a depth map for the captured primary camera image using the captured secondary camera image.

18. The portable device of claim 17, wherein the primary and secondary auto-focus cameras each include a lens system having a deformable optical element.

19. The portable device of claim 17, wherein the primary camera has a first field of view and the secondary camera has a second field of view and wherein the first and the second field of view are the same.

20. The portable device of claim 17, further comprising a third auto-focus camera on the second surface having a higher resolution to capture an image of the same scene and determining a depth map comprises relating the depth map to an image of the third camera.

* * * * *